United States Patent Office
3,509,122
Patented Apr. 28, 1970

3,509,122
DISAZO DYESTUFFS CONTAINING PHTHALIMIDE GROUPS
Walter Horstmann, Cologne-Buchheim, and Edgar Siegel, Leverkusen, Germany, assignors to Farbenfabriken Bayer Aktiengesellschaft, Leverkusen, Germany, a corporation of Germany
No Drawing. Filed Dec. 19, 1966, Ser. No. 602,529
Claims priority, application Germany, Dec. 28, 1965, F 48,022
Int. Cl. C09b *43/00, 43/12*
U.S. Cl. 260—157
13 Claims

ABSTRACT OF THE DISCLOSURE

Azo dyestuffs having the formula

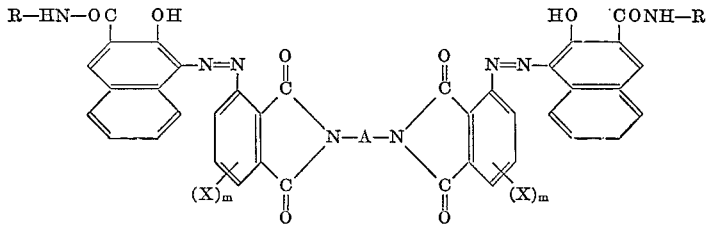

in which R denotes identical or different, optionally substituted aromatic or heterocyclic radicals, the radicals X are identical or different substituents, m denotes integers from 0 to 3 and A is an aliphatic radical which may be interrupted by hetero atoms or by optionally substituted aromatic radicals. The dyestuffs have good tinctorial strength, thermal stability, fastness to solvents, light and migration, and are suitable for coloring plastics, lacquers, or papers and for producing printing colors and pigment pastes.

DISCLOSURE

The object of the present invention comprises valuable new azo dyestuffs which are free from sulphonic acid groups and correspond to the general formula

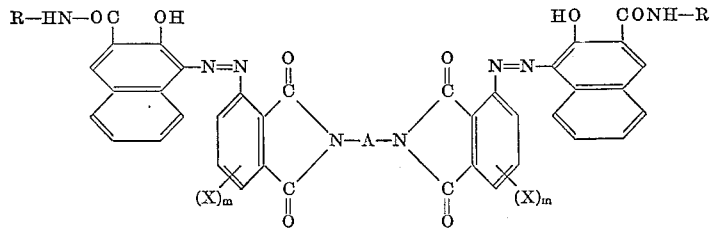

(I)

in which R denotes identical or different, optionally substituted aromatic or heterocyclic radicals, the radicals X are identical or different substituents, m denotes integers from 0 to 3 and A is an aliphatic radical which may be interrupted by hetero atoms or by optionally substituted aromatic radicals.

Suitable radicals A are, for example:

—CH₂CH₂—, —CH₂CH₂CH₂—CH₂CH—, —CH₂CH₂CH₂CH₂—
                                    |
                                    CH₃

—CH₂(CH₂)₄CH₂—, 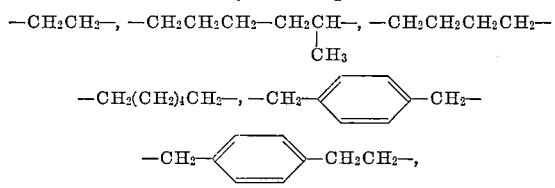

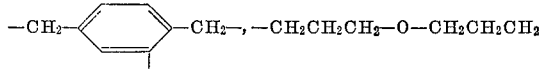

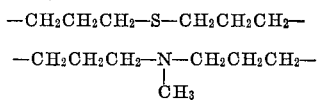

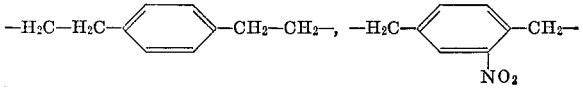

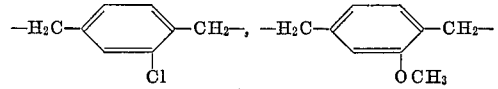

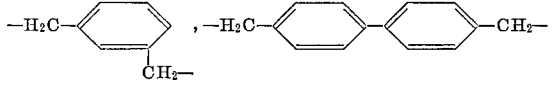

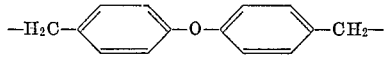

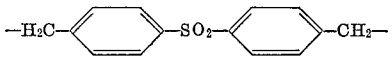

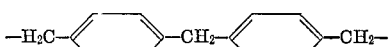

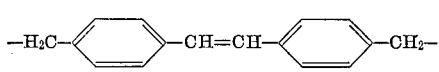

The radicals R can be mono- or polynuclear, radicals of the benzene and naphthalene series being preferred. In this context there may be mentioned, for example, the following radicals: phenyl-; 2- or 3- or 4-methylphenyl-1; 2- or 3- or 4-chlorophenyl-1; 2- or 3- or 4-methoxyphenyl-1; 2- or 3- or 4-ethoxy-phenyl-1; 2-methyl-4-chlorophenyl-1; 2-methyl-4-methoxyphenyl-1; 2- or 3- or 4-nitro-phenyl-1; 2,4-dimethyl-phenyl-1, 2,4-dimethoxy-5-chlorophenyl-1; 2,5-dimethoxy - 4 - chlorophenyl-1; 2-methyl-5-chlorophenyl-1; 2,5-dimethoxy-phenyl-1; naphthyl-1 or -2.

Suitable substituents X are, for example: lower alkyl, such as methyl and ethyl substituents, nitro substituents, lower alkoxy, such as methoxy or ethoxy substituents, chloro, fluoro, bromo, methyl-sulphonyl, phenyl-sulphonyl, trifluoromethyl substituents, and carbalkoxy, such as carbomethoxy and carbethoxy substituents.

A group of particularly valuable dyestuffs within the scope of the products of the formula (I) corresponds to the formula

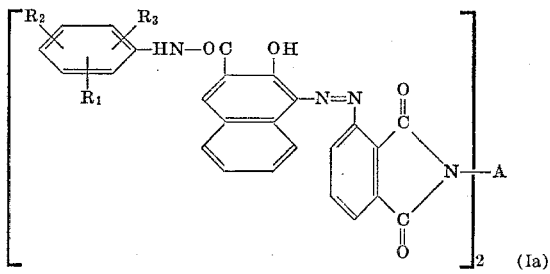

in which $R_1$ stands for hydrogen or nitro, methyl, methoxy, ethoxy or chloro substituents, $R_2$ stands for hydrogen, or methyl, methoxy, ethoxy or chloro substituents and $R_3$ stands for hydrogen or chloro substituents; A is an aliphatic radical, preferably a radical —$CH_2CH_2CH_2$, —$CH_2CH_2$, —$CH_2CH_2CH_2CH_2$ or

—$CH_2(CH_2)_4CH_2$

—$CH_2(CH_2)_3CH_2$ or an araliphatic radical; the dyestuffs are free from sulphonic acid groups.

The new azo dyestuffs of the Formulae I and Ia are obtained, when azo compounds of the formula

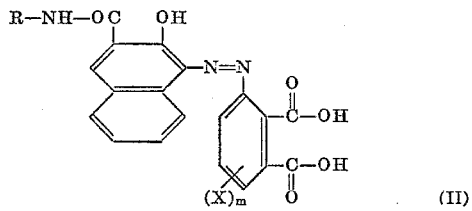

in which R, X and m have the same meaning as above, or azo compounds of the formula

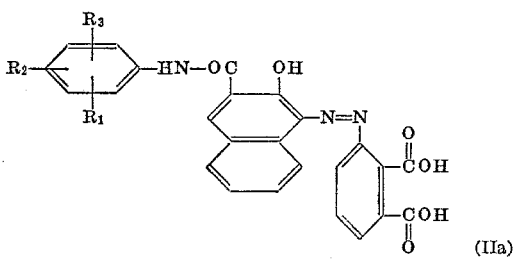

in which $R_1$, $R_2$ and $R_3$ have the same meaning as above, or functional derivatives of these dicarboxylic acids, especially the mono- and diesters, mono- or diamides, dicarbonimides or -anhydrides, are reacted with aliphatic diamines of the general formula $$H_2N—A—NH_2 \quad (III)$$

in which A has the same meaning as above, in a molar ratio of components (II) or (IIa) to component (III) of approximately 2:1, in the presence of acidic condensation agents, the components being so chosen that the final dyestuffs are free from sulphonic acid groups.

The reaction of the starting components is preferably carried out in a high-boiling organic solvent or solvent mixture, but the components themselves may also act as organic solvents.

The condensation is carried out at an elevated temperature, generally in the range from 80 to 240° C., preferably between 120° C. and 180° C.

The monoazo compounds of the Formulae II and IIa are obtained in known manner by diazotising the optionally substituted 3-amino-phthalic acids or their functional derivatives and coupling with 2-hydroxy-naphthoic acid-(3)-arylides, the components being free from sulphonic acid groups.

The following diazo components can be used for preparing the azo compounds (II) and (IIa), for example: 3-amino-phthalic acid, 3-amino-phthalic acid mono and diesters, such as 3-amino-phthalic acid monomethyl ester(1) or 3-amino-phthalic acid dimethyl ester, 3-amino-6-methyl-phthalic acid, 3-amino-5-methyl-phthalic acid, 3-amino-5-nitro-phthalic acid, 3-amino-6-nitro-phthalic acid, 3-amino-6-methoxy-phthalic acid, 3-amino - 6 - chlorophthalic acid, 3-amino-4-methoxy-phthalic acid, 3-amino-6-bromo-phthalic acid, 3-amino-6-fluoro-phthalic acid, 3-amino-6-trifluoromethyl-phthalic acid, 3-amino-5-trifluoromethyl-phthalic acid, 3 - amino-5,6-dimethoxy-phthalic acid, 3-amino-4,5,6-trimethoxy-phthalic acid, 3-amino-5,6-methylenedioxy-phthalic acid,(*) 3-amino-5-cyano-phthalic acid, 3-amino-6-cyano-phthalic acid, 3-amino-5-methoxy-6-ethoxy-phthalic acid, 3-amino-6-methylsulphonyl-phthalic acid, 3-amino-4-methyl-phthalic acid, 3-amino-5-carbethoxy-phthalic acid, 3-amino-6-carbethoxy-phthalic acid.

(*) 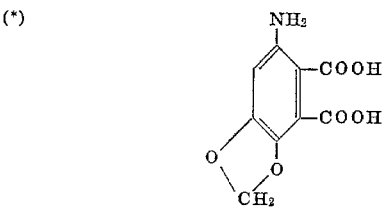

As coupling components for the synthesis of the monoazo compounds (II) and (IIa), there may be used, for example: 2-hydroxy-naphthoic acid-(3)-anilide, 2-hydroxy-naphthoic acid-(3) - (2'-methoxy-)-anilide, 2-hydroxy-naphthoic acid-(3) - (4'-methoxy-)-anilide, 2-hydroxy-naphthoic acid-(3)-(2'-methyl)- anilide, 2-hydroxy-naphthoic acid-(3)-(4'-methyl)-anilide, 2-hydroxy-naphthoic acid-(3)-(2',4'-dimethyl - anilide, 2-hydroxy-naphthoic acid-(3-(2'-chloro)-anilide, 2-hydroxy-naphthoic acid-(3-(2'-chloro)-anilide, 2-hydroxy-naphthoic acid-(3)-(4'-chloro)-anilide, 2-hydroxy-naphthoic acid-(3)-(2'-chloro-4'-methoxy)-anilide, 2 - hydroxy-naphthoic acid-(3)-(2'-methyl-4'-chloro)-anilide, 2 - hydroxy-naphthoic acid-(3) - (2'-methyl-5'-chloro)-anilide, 2-hydroxy-naphthoic acid-(3) - (2',4'-dimethoxy-5'-chloro)-anilide, 2-hydroxy-naphthoic acid-(3) - (2',5'-dimethoxy-4'-chloro)-anilide, 2-hydroxy-naphthoic acid-(3)-(2'-methyl-4'-methoxy)-anilide, 2 - hydroxy-naphthoic acid - (3)-(2'-methyl-3'-chloro)-anilide, 2-hydroxy-naphthoic acid-(3)-(2',3',4',5',6' - pentachloro)-anilide, 2-hydroxy-naphthoic acid-(3) - [naphthyl(1')] - amide, 2-hydroxy-naphthoic acid-(3) - [naphthyl(2')] - amide, 2-hydroxy-naphthoic acid-(3)-(2',4'-dimethoxy)-anilide, 2-hydroxy-naphthoic acid-(3)-(2'-ethoxy)-anilide, 2-hydroxy-naphthoic acid-(3)-(4'-ethoxy)-anilide, 2-hydroxy-naphthoic acid-(3-(2', 4'-diethoxy)-anilide, 2 - hydroxy-naphthoic acid-(3)-(2'-methoxy-5'-methyl)-anilide, 3 - methoxy-2-[(2'-hydroxy-3'-naphthoyl)-amino]-dibenzofuran.

It is also possible to use the alkyl, aryl, aralkyl mono- and diesters, anhydrides or imides of the above substituted phthalic acids. In comparison with the dicarboxylic acids, dicarboxylic acid anhydrides and imides, the esters are in many cases more readily soluble in the high-boiling organic solvents used.

The following diamines (III) are used, for example for the condensation of the azo compounds according to the invention: 1,2-diamino-ethane, 1,3-diamino-propane, 1,4-diamino butane, 1,5-diamino-pentane, 1,6-diamino-hexane, 3,3'-diamine-di-n-propyl ether, 3,3'-diamino-di-n-propyl thioether, N,N-bis - (3 - amino-n-propyl)-methylamine, 3,3'-diamino-di-n-propylsulphone, 1,4-di-(aminomethyl)-benzene, 1,4 - di-(aminomethyl)-2-nitrobenzene, 1,4-di-(aminomethyl) - 2 - chlorobenzene, 1,4-di-(aminomethyl) - 2 - methoxy-benzene, 1,4 - di - (amino-methyl) - 2 - ethoxy-benzene, 1,3 - di - (aminomethyl)-benzene, 4,4'-di-(aminomethyl)-diphenyl, 4,4' - di - (aminomethyl)-diphenyl ether, 4,4'-di-(aminomethyl)-diphenylmethane, 4,4'-di-(aminomethyl)-diphenyl-sulphone, 1,4-di-(aminomethyl)-naphthalene, 1-aminomethyl-4-(β-aminoethyl)-benzene.

For the condensation of the monoazo dyestuffs (II) and (IIa) with the diamines (III) in high-boiling organic solvents, there may be mentioned the following solvents boiling above 80° C., for example: benzene, toluene, xylenes, chlorobenzene, o-, m- p-dichlorobenzene, trichlorobenzenes, nitrobenzene, quinoline, glacial acetic acid, cyclohexane, 1,2,3,4-tetrahydro-naphthalene, naphthalene, tetrachloroethylene, di-n-butyl ether, anisole, diphenyl ether, decalin and mixtures of solvents of this type.

Suitable acidic condensation agents are, for example: acetic acid, propionic acid, anhydrous sodium acetate, zinc chloride, ferric chloride, aluminum chloride, hydrochloric acid, sulphuric acid and orthophosphoric acid.

The reaction of the dicarboxy-azo compounds (II) or (IIa) or of their functional derivatives with the diamines (III) is carried out in a proportion of approximately 2:1. A slight excess of the components (II) or (IIa) is frequently desirable in order to react the component (III) completely.

Depending on the choice of components (II) or (IIa), symmetrical or asymmetrical dyestuffs of the Formula I can be synthetised.

To prepare the preferred group of dyestuffs of the Formula Ia, a diamine of the Formula III is condensed with an azo-dicarboxylic acid of the Formula IIa under the stated conditions in a ratio of approximately 1:2.

The products obtained according to the present process are barely soluble to insoluble in water. They are valuable pigment dyestuffs the shades of which are predominantly in the yellow-red to bluish red range. The dyestuffs are in part obtained in the amorphous state but predominantly in crystalline form. They are characterised by a very good tinctorial strength, thermal stability, fastness to solvents, light and migration, and are therefore suitable for colouring plastics, lacquers, or papers and for producing printing colours and pigment pastes.

Due to their excellent thermal stability, the products are especially suitable for colouring polyvinyl chloride and for colouring acrylonitrile-butadiene-styrene copolymers. They are still stable at temperatures of 200° C. and above.

Belgian patent specification No. 652,251 describes pigment dyestuffs of the general structure

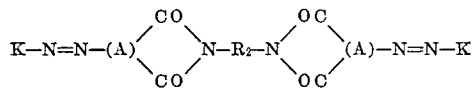

in which K is defined as the radical of any coupling component, A as an aromatic or heterocyclic system and $R_2$ as a bivalent alkyl, aryl, aralkyl or hetero radical.

The patent specification, however, does not contain a single example of a dyestuff of the general formula there stated, and not even an example of only one of the components K, A and $R_2$. The patent specification otherwise contains only a few, very general statements regarding processes for the production of the pigment dyestuffs.

In the following examples the parts are parts by weight; the temperatures are given in degrees centigrade.

Example 1

90 parts 3-amino-phthalic acid are suspended in 1500 parts of water, 162 parts of concentrated hydrochloric acid are added and the mixture is diazotised at 0–5° with a solution of 34.2 parts sodium nitrite in 200 parts of water. The excess nitrite is removed by means of aminosulphonic acid.

152 parts 2 - hydroxy-naphthoic acid-(3)-4'-ethoxyanilide are suspended in 320 parts ethanol, a solution of 80 parts caustic soda in 200 parts water is added, 500 parts ice are thrown in and the mixture is coupled at 5–15° with the above diazo suspension by adding the latter in portions to the coupling mixture. Stirring is continued at 10–15° for 2–3 hours, the mixture is then acidified with 10% hydrochloric acid, suction-filtered, the filtrate is washed with water until free from acid and dried n a drying cabinet at 80°. The yield amounts to 220 parts of azo dyestuff.

For conversion into the anhydride, the dry powdered dyestuff is suspended in 1000 parts chlorobenzene, 100 parts acetic anhydride are added and the mixture is heated at 100–110° for 4 hours. The product is filtered off with suction at 20° and rinsed with benzine. The yield of monoazo-o-dicarboxylic anhydride amounts to 180 parts.

10 parts of this anhydride are suspended in 500 parts o-dichlorobenzene, 50 parts glacial acetic acid and 0.60 part ethylene-diamine are added and the mixture is heated at 140° for 25–30 hours. The precipitated pigment is filtered off with suction at 60–70°, washed with hot o-dichlorobenzene and dried in a vacuum at 80° until the weight remains constant. The yield amounts to 9.2 parts of the pigment dyestuff of the constitution

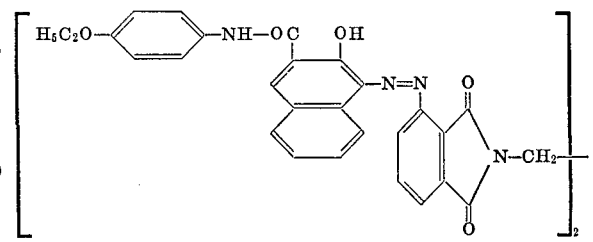

The pigment dyestuff prepared in the manner described above has a good tinctorial strength and a very good fastness to light, lacquer coating and migration.

Example 2

132 parts 3-amino-phthalic acid are suspended in 2300 parts of ice water, 245 parts of concentrated hydrochloric acid are added and the mixture is diazotised at 0–5° with a solution of 50.3 parts sodium nitrite in 200 parts of water. The excess nitrite is destroyed by means of amidosulphonic acid.

205 parts 2 - hydroxy-naphthoic acid-(3)-(2'-methyl)-anilide are suspended in 300 parts ethanol, a solution of 110 parts caustic soda in 350 parts water is added, 400 parts of ice are thrown in, and the above diazo suspension is introduced in portions at 5–10° into the coupling mixture thus prepared. Stirring is continued at 10–15° for 2–3 hours, the reaction mixture is adjusted to pH 1–2 by the addition of dilute hydrochloric acid, the precipitated azo dyestuff is filtered off with suction, washed with water until free from acid and dried at 80°. The yield amounts to 320 parts monoazo-o-dicarboxylic acid. M.P. 298–300°.

9.60 parts of this dyestuff are suspended in 500 parts o-dichlorobenzene, 50 parts glacial acetic acid are added and the mixture is heated at 120–130° for 4 hours. 1.16 parts hexamethylene-diamine are then added and heating is continued at 130° for 25 hours. The precipitated pigment is isolated at 60–70°, washed with a little warm o-dichlorobenzene and dried in a vacuum at 80° until the weight remains constant. 9.3 parts of a dyestuff are thus obtained which is bluish-red when diluted and has an excellent tinctorial strength.

Example 3

10.0 parts of the azo dyestuff obtained from 3-aminophthalic acid and 2 - hydroxy-naphthoic acid-(3)-(2'-methoxy)-anilide (for preparation cf. Examples 1 and 2) are suspended in 950 parts chlorobenzene, 50 parts glacial acetic acid are added and the mixture is heated at 120° for 3–4 hours. 1.36 parts 1,4 - di-(aminomethyl)-benzene are then added and heating is continued for 25 hours under gentle reflux. The pigment is filtered off with suction at 60–70°, washed with 100 parts chlorobenzene at 60–

70°, and dried in a vacuum at 80° until the weight remains constant. 10.0 parts of a red pigment dyestuff are obtained.

Very valuable red pigment dyestuffs are also obtained by following the procedure described in these examples but using, instead of the diazo component, coupling components and diamines there stated, the diazo, coupling and diamine components compiled in the following Table.

| Diazo component | Coupling component | Diamine |
|---|---|---|
| 3-amino-phthalic acid | 2-hydroxy-naphthoic acid-(3)-(2'-methyl)-anilide. | 1,2-diamino-ethane. |
| Do | do | 4,4'-di-(aminomethyl)-diphenylmethane. |
| Do | do | 1,4-diaminobutane. |
| Do | do | 1,4-di-(aminomethyl)-benzene. |
| Do | do | 3,3'-diamino-di-n-propyl ether. |
| Do | do | 4,4'-di-(aminomethyl)-diphenylether. |
| Do | 2-hydroxy-naphthoic acid-(3)-(4'-ethoxy)-anilide. | 1,4-diamino-butane. |
| Do | do | 3,3'-diamino-di-n-propyl ether. |
| Do | do | 1,4-di-(aminomethyl)-benzene. |
| Do | do | 1,4-di-(aminomethyl)-3-methyl-benzene. |
| Do | do | 1-aminomethyl-4(β-aminoethyl)-benzene. |
| Do | 2-hydroxy-naphthoic acid-(3)-(2',5'-dimethoxy-4'-chloro)-anilide. | 1,2-diamino-ethane. |
| Do | do | 1,4-diamino-butane. |
| Do | do | 3,3'-diamino-di-n-propyl ether. |
| Do | do | 1,4-di-(aminomethyl)-benzene. |
| Do | do | 1,4-di-(aminomethyl)-3-methyl-benzene. |
| Do | do | 4,4'-di-(aminomethyl)-diphenyl. |
| Do | do | N,N-bis-(3-amino-n-propyl)-methylamine. |
| Do | 2-hydroxy-naphthoic acid-(3)-(3'-nitro)-anilide. | 1,2-diamino-ethane. |
| Do | do | 1,4-di-(aminomethyl)-benzene. |
| Do | do | 3,3'-diamino-di-n-propyl ether. |
| Do | do | 4,4'-di-(aminomethyl)-diphenylmethane. |
| Do | do | 4,4'-di-(aminomethyl)-diphenyl ether. |
| Do | 2-hydroxy-naphthoic acid-(3)-(2'-methoxy)-anilide. | 1,2-diamino-ethane. |
| Do | do | 1,4-diamino-butane. |
| Do | do | 1,6-diaminohexane. |
| Do | do | 4,4'-di-(aminomethyl)-diphenyl. |
| Do | do | 3,3'-diamino-di-n-propyl ether. |
| Do | 2-hydroxy-naphthoic acid-(3)-anilide. | 1,2-diamino-ethane. |
| Do | do | 1,4-di-(aminomethyl)-benzene. |
| Do | do | 3,3'-diamino-di-n-propyl ether. |
| Do | do | 4,4'-di-(aminomethyl)-diphenylmethane. |
| Do | do | 4,4'-di-(aminomethyl)-diphenyl ether. |
| Do | 2-hydroxy-naphthoic acid-(3)-(4'-methoxy)-anilide. | 1,2-diaminoethane. |
| Do | do | 1,4-diamino-butane. |
| Do | do | 1,4-di-(aminomethyl)-benzene. |
| Do | do | 4,4'-di-(aminomethyl)-diphenyl. |
| Do | do | 3,3'-diamino-di-n-propyl ether. |
| Do | 2-hydroxy-naphthoic acid-(3)-(4'-methyl)-anilide. | 1,2-diamino-ethane. |
| Do | do | 1,4-di-(aminomethyl)-benzene. |
| Do | do | 3,3'-diamino-di-n-propyl ether. |
| Do | do | 4,4'-di-(aminomethyl)-diphenyl ether. |
| Do | do | 4,4'-di-(aminomethyl)-diphenylmethane. |
| Do | 2-hydroxy-naphthoic acid-(3)-(4'-chloro)-anilide. | 1,2-diamino-ethane. |
| Do | do | 1,6-diamino-hexane. |
| Do | do | 1,4-di-(aminomethyl)-benzene. |
| Do | do | 4,4'-di-(aminomethyl)-diphenyl. |
| Do | do | 3,3'-diamino-di-n-propyl ether. |
| Do | 2-hydroxy-naphthoic acid-(3)-[naphthyl-(2')]-amide. | 1,2-diamino-ethane. |
| Do | do | 1,4-diamino-butane. |
| Do | do | 1,4-di-(aminomethyl)-benzene. |
| Do | do | 4,4'-di-(aminomethyl)-diphenyl. |
| Do | 2-hydroxy-naphthoic acid-(3)-(2',4'-dimethoxy-5'-chloro)-anilide. | 1,2-diamino-ethane. |
| Do | do | 1,6-diamino-hexane. |
| Do | do | 1,4-di-(aminomethyl)-3-methyl-benzene. |
| Do | do | 4,4'-di-(aminomethyl)-diphenyl ether. |
| Do | do | 3,3'-diamino-di-n-propyl ether. |
| Do | 2-hydroxy-naphthoic acid-(3)-(2'-methyl-3'-chloro)-anilide. | 1,2-diamino-ethane. |
| Do | do | 1,6-diamino-hexane. |
| Do | do | 1,4-di-(aminomethyl)-benzene. |
| Do | do | 4,4'-di-(aminomethyl)-diphenyl. |
| Do | do | 4,4'-di-(aminomethyl)-diphenylmethane. |
| Do | do | 4,4'-di-(aminomethyl)-diphenyl ether. |
| Do | do | 3,3'-diamino-di-n-propyl ether. |
| Do | 2-hydroxy-naphthoic acid-(3)-(2'-methyl-4'-methoxy)-anilide. | 1,2-diamino-ethane. |
| Do | do | 1,4-diamino-butane. |
| Do | do | 1,6-diamino-hexane. |
| Do | 2-hydroxy-naphthoic acid-(3)-(2'-ethoxy)-anilide. | 1,2-diamino-ethane. |
| Do | do | 1,6-diamino-hexane. |
| Do | do | 1,4-di-(aminomethyl)-benzene. |
| Do | 2-hydroxy-naphthoic acid-(3)-(3',5'-dimethyl)-anilide. | 1,2-diamino-ethane. |
| Do | do | 1,4-diamino-butane. |
| Do | do | 3,3'-diamino-di-n-propyl ether. |
| Do | 2-hydroxy-naphthoic acid-(3)-(2',3'-dimethyl)-anilide. | 1,2-diamino-ethane. |

| Diazo component | Coupling component | Diamine |
|---|---|---|
| Do | 2-hydroxy-naphthoic acid-(3)-(2'-methyl-4'-chloro)-anilide. | Do. |
| Do | 2-hydroxy-naphthoic acid-(3)-(2'-methoxy-5'-chloro)-anilide. | Do. |
| Do | 2-hydroxy-naphthoic acid-(3)-(2'-methoxy-4'-chloro-5'-methyl)-anilide. | Do. |
| Do | 2-hydroxy-naphthoic acid-(3)-(2'-methyl-5'-chloro)-anilide. | Do. |
| Do | 2-hydroxy-naphthoic acid-(3)-(2',4'-dimethyl)-anilide. | Do. |
| Do | 2-hydroxy-naphthoic acid-(3)-(2',5'-dimethoxy)-anilide. | Do. |
| Do | 2-hydroxy-naphthoic acid-(3)-[naphthyl-(1')]-amide. | Do. |
| Do | 2-hydroxy-naphthoic acid-(3)-(4'-acetylamino)-anilide. | 1,4-diamino-butane. |
| Do | do | 1,6-diamino-hexane. |
| Do | 5-[2'-hydroxy-naphthoyl-(3')-amino]-benzimidazolone. | 1,2-diamino-ethane. |
| Do | do | 1,4-diamino-butane. |
| Do | do | 1,6-diamino-hexane. |
| Do | 2-hydroxy-naphthoic acid-(3)-(4'-benzoylamino)-anilide. | 1,2-diamino-ethane. |
| Do | do | 1,6-diamino-hexane. |
| 3-amino-6-methoxy-phthalic acid. | 2-hydroxy-naphthoic acid-(3)-anilide. | 1,2-diamino-ethane. |
| Do | 2-hydroxy-naphthoic acid-(3)-(4'-ethoxy)-anilide. | Do. |
| Do | 2-hydroxy-naphthoic acid-(3)-(4'-chloro)-anilide. | Do. |
| Do | 2-hydroxy-naphthoic acid-(3)-(2'-methyl)-anilide. | Do. |
| Do | 2-hydroxy-naphthoic acid-(3)-(2'-methyl-4'-methoxy)-anilide. | Do. |
| 3-amino-6-chloro-phthalic acid. | 2-hydroxy-naphthoic acid-(3)-anilide. | Do. |
| Do | 2-hydroxy-naphthoic acid-(3)-(2'-methyl)-anilide. | Do. |
| Do | 2-hydroxy-naphthoic acid-(3)-(4'-ethoxy)-anilide. | Do. |
| Do | 2-hydroxy-naphthoic acid-(3)-(2'-ethoxy)-anilide. | Do. |
| 3-amino-4-chlorophthalic acid. | 2-hydroxy-naphthoic acid-(3)-anilide. | Do. |
| Do | 2-hydroxy-naphthoic acid-(3)-(4'-chloro)-anilide. | Do. |
| Do | 2-hydroxy-naphthoic acid-(3)-(2'-methyl-4'-methoxy)-anilide. | Do. |
| Do | 2-hydroxy-naphthoic acid-(3)-(2'-methyl)-anilide. | Do. |
| 3-amino-4,5-dichlorophthalic acid. | 2-hydroxy-naphthoic acid-(3)-anilide. | Do. |
| Do | 2-hydroxy-naphthoic acid-(3)-(2'-methyl)-anilide. | Do. |
| Do | 2-hydroxy-naphthoic acid-(3)-(4'-ethoxy)-anilide. | Do. |
| 3-amino-6-methyl-phthalic acid. | 2-hydroxy-naphthoic acid-(3)-anilide. | Do. |
| Do | 2-hydroxy-naphthoic acid-(3)-(2'-methyl)-anilide. | Do. |
| Do | 2-hydroxy-naphthoic acid-(3)-(4'-ethoxy)-anilide. | Do. |
| Do | 2-hydroxy-naphthoic acid-(3)-(4'-chloro)-anilide. | Do. |

Example 4

10 parts of the anhydride of the dyestuff which is obtained by coupling diazotised 3-amino-phthalic acid with 2-hydroxy-naphthoic acid-(3)-4'-ethoxy-anilide and 1.16 parts of 1,6-diamino-hexane are heated for 5 hours at 120–130° in a mixture of 250 parts p-xylene and 25 parts glacial acetic acid. The precipitated pigment is filtered off with suction at 60–70°, washed with hot p-xylene and dried at 100° in a drying cabinet. The yield amounts to 8.2 parts of pigment dyestuff which has a very good fastness to light.

Example 5

10.5 parts of the dyestuff obtained from diazotised 3-amino-phthalic acid and 2-hydroxy-naphthoic acid-(3)-2'-ethoxy-analide and 9.6 parts of the dyestuff obtained from 3-amino-phthalic acid and 2-hydroxy-naphthoic-acid-(3)-anilide are heated for 30 minutes at 120° in a mixture of 450 parts o-dichlorobenzene and 50 parts glacial acetic acid and 1.2 parts ethylene diamine added subsequently. After heating for 2 hours at 120° the mixture is cooled at 60–70°, the precipitated pigment is filtered off with suction, washed with 200–300 parts o-dichloro-benzene and dried at 100° in a vacuum until the weight remains constant. 16.8 parts of pigment are thus obtained. This mixture of the three possible disazo dyestuffs has a good fastness to light and lacquer coating.

Example 6

20 parts of the azo dyestuff obtained from diazotised 3-amino-6-methoxy-phthalic acid and 2-hydroxy-naphthoic-acid-(3)-anilide are heated for 30 minutes at 130° in a mixture of 450 parts nitrobenzene and 50 parts propionic acid. 2.64 parts 3,3'-diamino-di-n-propyl-ether are then added and the mixture heated for further 4 hours at 120–130°. The precipitated pigment is filtered off with suction at 50–60°, washed with warn nitrobenzene and subsequently with methanol, and dried. The yield amounts to 17.3 parts of the pigment dyestuff of the constitution

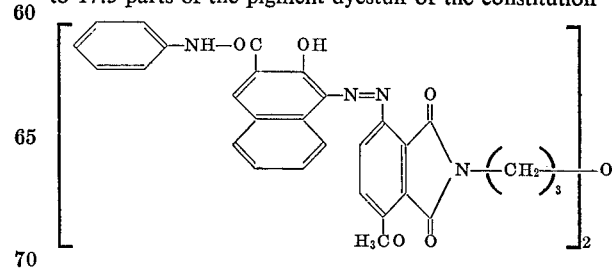

Example 7

10.7 parts of the azo dyestuff obtained from diazotised 3-amino-phthalic-acid and 2-hydroxy-naphthoic acid-(3)-(4'-acetylamino)-anilide are heated for 30 minutes at 120° in a mixture of 220 parts o-dichlorobenzene and 30 parts glacial acetic acid. 0.6 part of ethylendiamine is then added and the mixture heated for further 3 hours at 120–130°. The precipitated pigment is filtered off with suction at 60–70°, washed with o-dichlorobenzene and dried in a vacuum at 80° until the weight remains constant. The yield amounts to 9.8 parts of the pigment dyestuff of the constitution

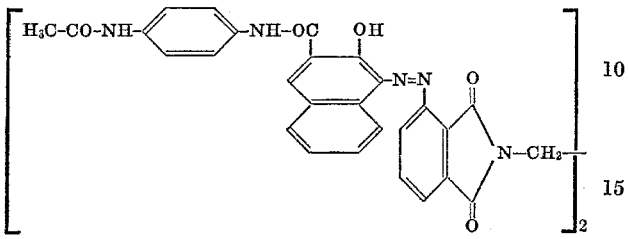

The pigment dyestuff has a good fastness to light and migration.

Example 8

10.3 parts of the azo dyestuff obtained from diazotised 3-amino-4-chloro-phthalic acid and 2-hydroxy-naphthoic acid-4-chloro-anilide and 2.28 parts of 4,4'-di-(aminomethyl)-diphenyl ether are heated for 4 hours at 130° in a mixture of 220 parts o-dichlorobenzene and 30 parts glacial acetic acid. The precipitated pigment is filtered off at 60–70°, washed with warm o-dichlorobenzene and dried in a vacuum at 80° until the weight remains constant. 10.1 parts disazo dyestuff are thus obtained.

We claim:

1. Azo dyestuffs which are free from sulfonic acid and corresponding to the formula

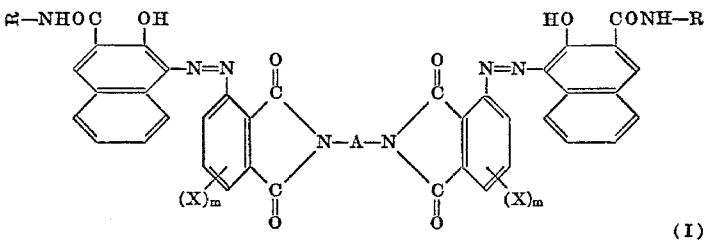

in which R is phenyl or naphthyl or phenyl or naphthyl substituted with methyl, chloro, methoxy, ethoxy or nitro; X is lower alkyl, lower alkoxy, nitro, chloro, fluoro, bromo, methyl-sulphonyl, phenyl-sulphonyl, trifluoromethyl or carbalkoxy; m is a number from 0 to 3; and A is a saturated aliphatic hydrocarbyl chain, or a saturated aliphatic hydrocarbyl chain containing in the chain linkages of —O—, —S—, >NCH$_3$, SO$_2$, diphenylene, diphenylene oxide, diphenylene sulphone, diphenylene methane, stilbene, phenylene, or phenylene substituted with nitro, chloro, methoxy or ethoxy on the ring.

2. Azo dyestuff free from sulfonic acid groups and corresponding to the formula

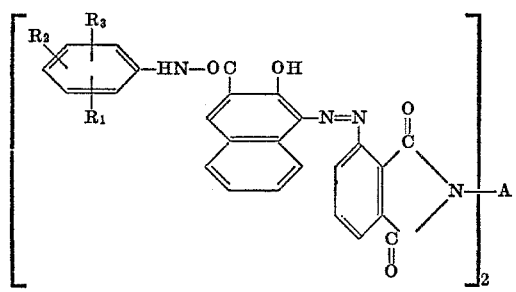

in which R$_1$ is hydrogen, nitro, methyl, methoxy, ethoxy, or chloro; R$_2$ is hydrogen, methyl, methoxy, ethoxy or chloro; R$_3$ is hydrogen or chloro; and A is a saturated aliphatic hydrocarbyl chain, or an aliphatic hydrocarbyl chain containing in the chain linkages of —O—, —S—, >NCH$_3$, SO$_2$, diphenylene, diphenylene oxide, diphenylene sulphone, diphenylene methane, stilbene, phenylene, or phenylene substituted with nitro, chloro, methoxy or ethoxy on the ring.

3. Azo dyestuff free from sulphonic acid groups according to claim 2, in which A stands for a member selected from the group consisting of 1,2-ethylene, 1,3-propylene, 1,4-butylene, 1,5-pentylene and 1,6-hexylene radicals and

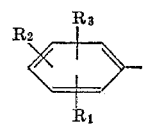

stands for a member selected from the group consisting of phenyl, 2-methyl-phenyl-1, 3-methyl-phenyl-1, 4-methyl-phenyl-1, 2-chloro-phenyl-1, 3-chloro-phenyl-1, 4-chloro-phenyl-1, 2-methoxy-phenyl-1, 3-methoxy-phenyl-1, 4-methoxy-phenyl-1, 2-nitro-phenyl-1, 3-nitro-phenyl-1, 4-nitro-phenyl-1, 2-ethoxy-phenyl-1, 3-ethoxy-phenyl-1, 4-ethoxy-phenyl-1, 2-methyl-4-chloro-phenyl-1, 2,5-dimethoxy-4-chloro-phenyl-1, 2,4-dimethoxy-5-chloro-phenyl-1, naphthyl-1 and naphthyl-2.

(I)

4. The dyestuff of the formula

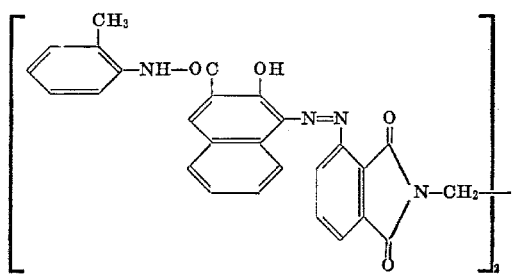

5. The dyestuff of the formula

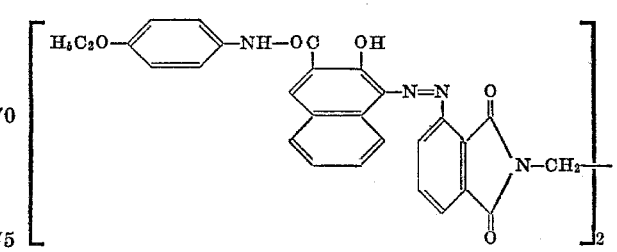

6. The dyestuff of the formula
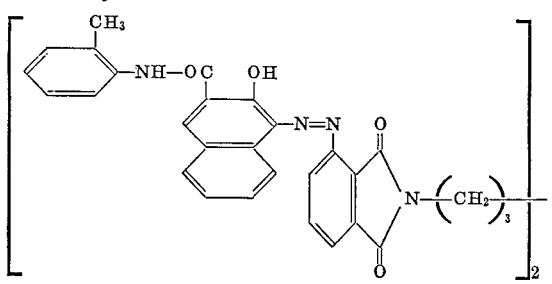
7. The dyestuff of the formula
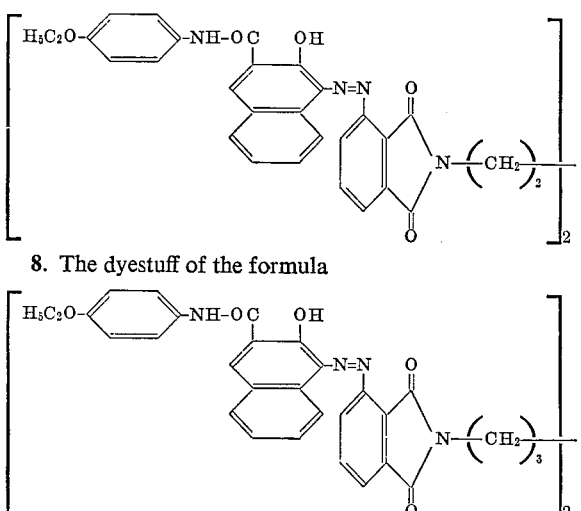
8. The dyestuff of the formula
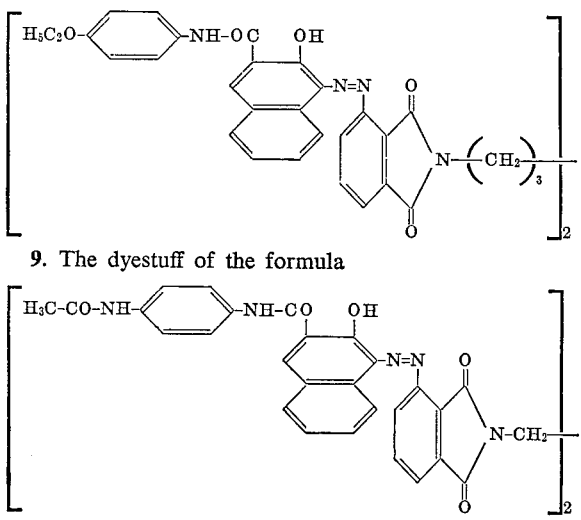
9. The dyestuff of the formula
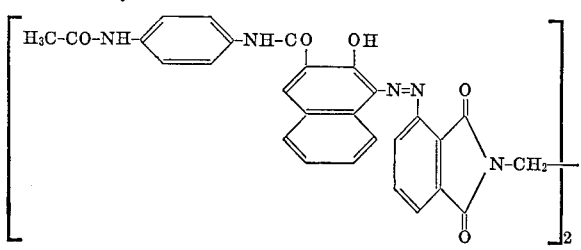
10. The dyestuff of the formula
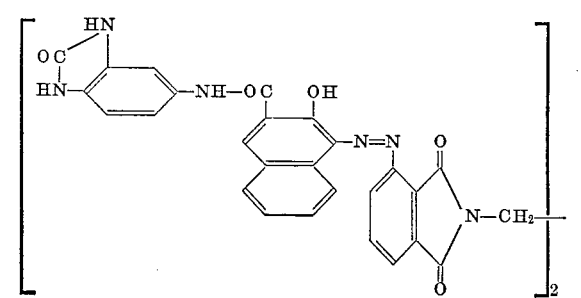
11. The dyestuff of the formula
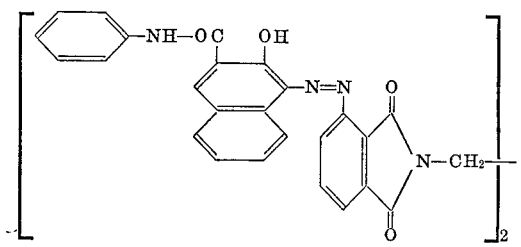
12. The dyestuff of the formula
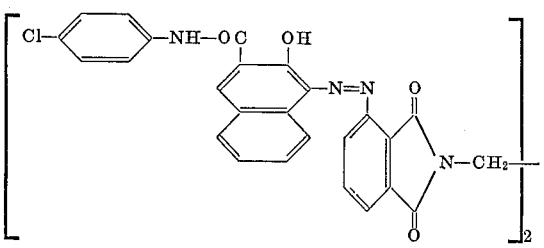
13. The dyestuff of the formula
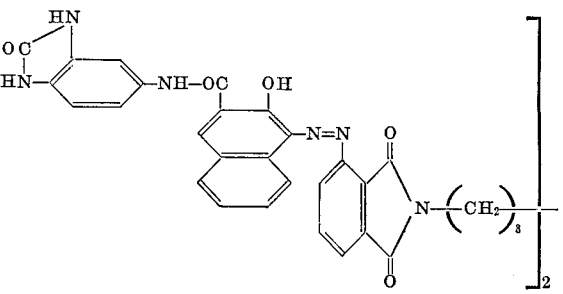
References Cited
UNITED STATES PATENTS
| | | | |
|---|---|---|---|
| 2,961,438 | 11/1960 | Fuchs et al. | 260—152 |
| 3,356,672 | 12/1967 | Schefczik | 260—152 |
| 3,402,166 | 9/1968 | Heckl et al. | 260—152 |
FLOYD D. HIGEL, Primary Examiner
U.S. Cl. X.R.
8—41, 4, 7, 71; 106—288; 117—138.8, 152; 260—152, 204, 41, 41.5